United States Patent
Chou

(10) Patent No.: US 8,476,792 B2
(45) Date of Patent: Jul. 2, 2013

(54) VOICE COIL MOTOR EMPLOYING ELASTIC ELECTRODE MEMBER HAVING TWO ELASTIC SHEETS SEPARATED FROM EACH OTHER

(75) Inventor: Tai-Hsu Chou, New Taipei (TW)

(73) Assignee: Wcube Co., Ltd., George Town (KY)

( * ) Notice: Subject to any disclaimer, the term of this patent is extended or adjusted under 35 U.S.C. 154(b) by 116 days.

(21) Appl. No.: 13/216,186

(22) Filed: Aug. 23, 2011

(65) Prior Publication Data

US 2012/0306294 A1     Dec. 6, 2012

(30) Foreign Application Priority Data

May 31, 2011    (TW) ............................. 100118932 A

(51) Int. Cl.
*H02K 41/03* (2006.01)
*H02K 33/00* (2006.01)
*G02B 7/02* (2006.01)

(52) U.S. Cl.
USPC ........ 310/12.16; 310/12.31; 310/21; 359/824

(58) Field of Classification Search
USPC ............... 310/12.16, 13, 14, 21, 29; 359/811, 359/814, 819, 824
IPC ....................................................... H02K 41/03
See application file for complete search history.

(56) References Cited

U.S. PATENT DOCUMENTS

| 7,589,922 B2 * | 9/2009 | Higuchi | 359/824 |
| 2008/0007850 A1 * | 1/2008 | Huang | 359/824 |
| 2008/0259470 A1 * | 10/2008 | Chung | 359/823 |

* cited by examiner

*Primary Examiner* — Tran Nguyen
*Assistant Examiner* — Thomas Truong
(74) *Attorney, Agent, or Firm* — Altis Law Group, Inc.

(57) ABSTRACT

A voice coil motor includes a lens retainer, a wire, and an elastic electrode member. The lens retainer includes an end portion. The wire wraps around the lens retainer and includes a first end and a second end. The elastic electrode member is metal and is mounted to the end portion. The elastic member includes a first elastic metal sheet and a second elastic metal sheet. The first elastic metal sheet includes a first electrode. The second elastic plate is physically separated from the first elastic sheet and includes a second electrode. The first end and the second end are respectively soldered to the first electrode and the second electrode.

9 Claims, 3 Drawing Sheets

VOICE COIL MOTOR EMPLOYING ELASTIC ELECTRODE MEMBER HAVING TWO ELASTIC SHEETS SEPARATED FROM EACH OTHER

BACKGROUND

1. Technical Field

The present disclosure relates to motors and, particularly, to a voice coil motor (VCM).

2. Description of Related Art

VCMs are widely used, for example, as lens actuators in camera modules. A typical VCM includes a lens retainer and two elastic electrodes. The lens retainer is usually a hollow cylinder and wound by a wire. The lens retainer includes two opposite end surfaces. The elastic members are metal sheets and mounted to the respective end surfaces. Two ends of the wire are connected to the respective elastic electrodes typically by soldering. A power source is connected to the elastic electrodes and provides electric power for the VCM via the elastic electrodes. However, it is inconvenient to mount the elastic electrodes to both the end surfaces of the lens retainer and solder the ends of the wire to the respective elastic electrodes.

What is needed is a disclosure that can overcome the above shortcomings

BRIEF DESCRIPTION OF THE DRAWINGS

Many aspects of the present VCM can be better understood with reference to the following drawings. The components in the drawings are not necessarily drawn to scale, the emphasis instead being placed upon clearly illustrating the principles of the present VCM. Moreover, in the drawings, like reference numerals designate corresponding parts throughout the several views.

DETAILED DESCRIPTION

Embodiments of the present VCM will now be described in detail below and with reference to the drawings.

Figure 1:
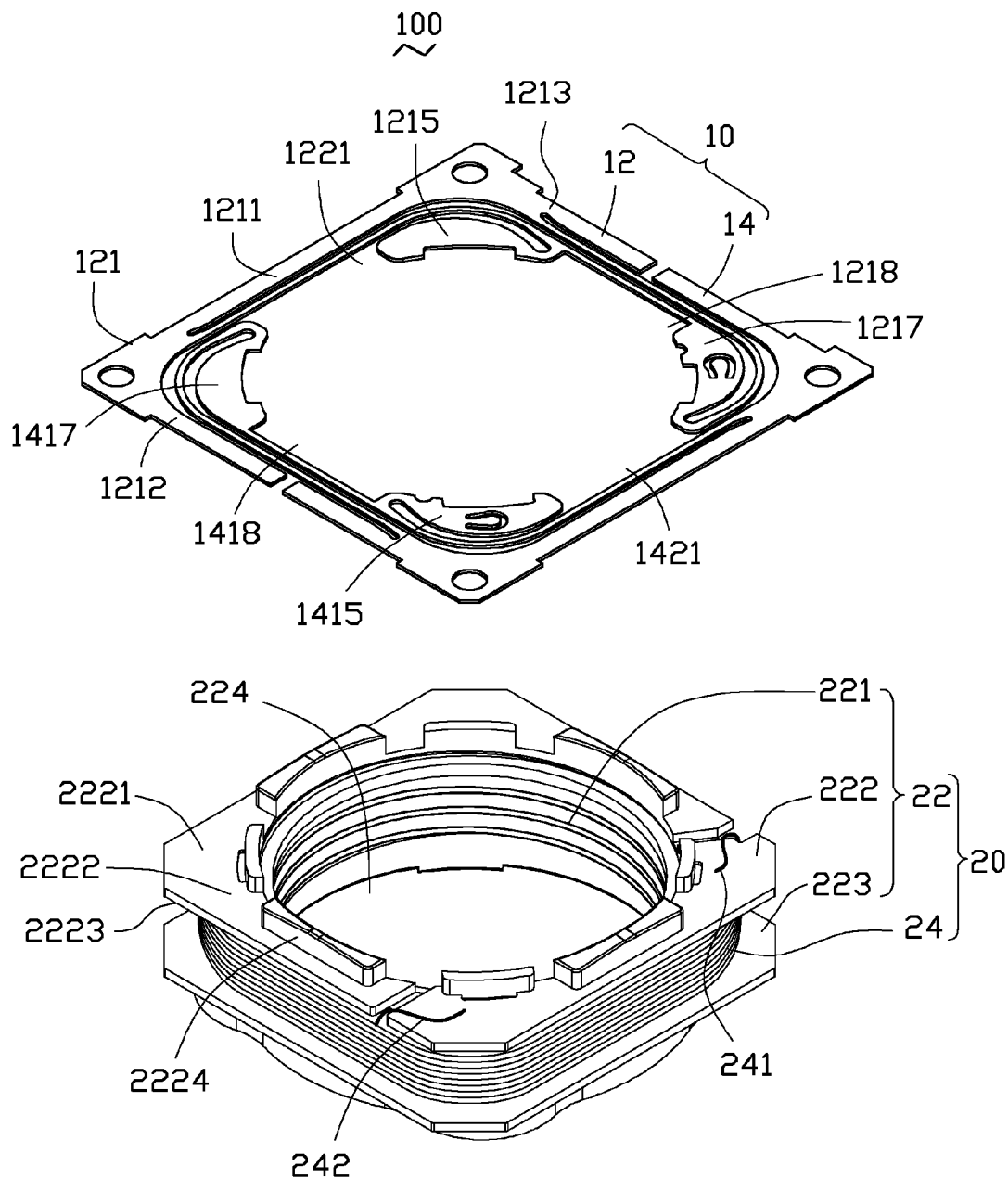
FIG. 1 is an isometric, exploded view of a VCM in accordance with an exemplary embodiment.
Figure 2:
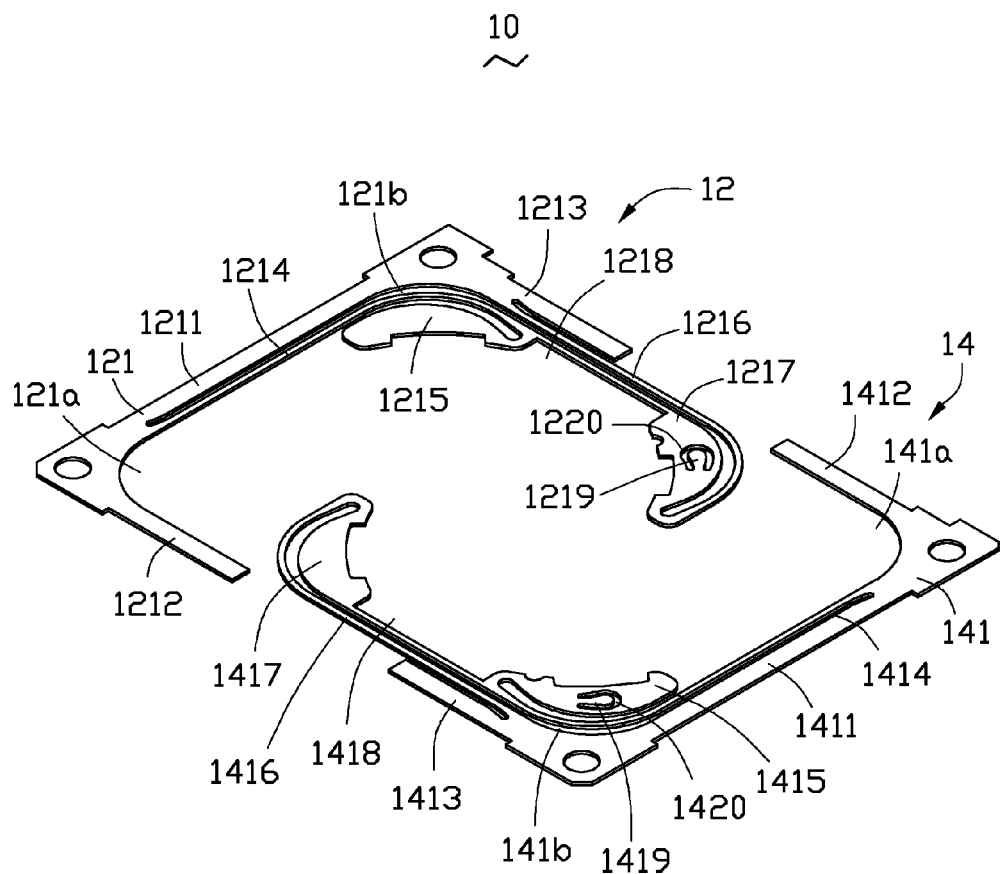
FIG. 2 is an isometric, exploded view of an elastic electrode member of the VCM of FIG. 1.

Referring to FIGS. 1 and 2, a VCM 100 in accordance with an exemplary embodiment is provided. The VCM 100 includes an elastic electrode member 10 and an actuator 20.

The elastic electrode member 10 includes a first elastic metal sheet 12 and a second elastic metal sheet 14 physically separated from the first elastic metal sheet 12. The first elastic metal sheet 12 and the second elastic metal sheet 14 can be made by, for example, stamping.

The first elastic metal sheet 12 includes a generally U shaped first frame 121. The first frame 121 includes a first section 1211, a second section 1212, and a third section 1213. The first section 1211, the second section 1212, and the third section 1213 are generally rectangular strips. The second section 1212 is substantially perpendicularly connected to one end of the first section 1211. The third section 1213 is substantially perpendicularly connected to the other end of the first section 1211 distant from the second section 1212. A first inner corner 121a positioned at the intersection of the first section 1211 and the second section 1212 is generally arced. A second inner corner 121b positioned at the intersection of the first section 1211 and the third section 1213 is also arced. An L-shaped first arm portion 1214 extends from the first section 1211 adjacent to the first inner corner 121a toward the second inner corner 121b along a direction substantially parallel to the first section 1211. A first contact portion 1215, which is generally crescent-shaped, extends from a distal end of the first arm portion 1214. The first contact portion 1215 is in the second inner corner 121b. A second arm portion 1216 extends from the third section 1213 adjacent to the second inner corner 121b along a direction parallel to the third section 1213. The second arm portion 1216 extends beyond the third section 1213. A second contact portion 1217, which is generally crescent-shaped, extends from a distal end of the second arm portion 1216. A first alignment groove 1218 is formed between the first contact portion 1215 and the second contact portion 1217. A first slot 1220, which is generally crescent-shaped, is formed in the center of and extends through the second contact portion 1217, leaving a first electrode 1219, which is generally circular.

The structure of the second elastic metal sheet 14 is similar to the first elastic metal sheet 12. The second elastic metal sheet 14 includes a U-shaped second frame 141. The second frame 141 includes a fourth section 1411, a fifth section 1412, and a sixth section 1413. The fourth section 1411, the fifth section 1412, and the sixth section 1413 are generally rectangular. The fifth section 1412 is substantially perpendicularly connected to one end of the fourth section 1411. The sixth section 1413 is substantially perpendicularly to the other end of the fourth section 1411 distant from the fifth section 1412. A third inner corner 141a positioned at the intersection of the fourth section 1411 and the fifth section 1412 is generally arced. A fourth inner corner 141b is positioned at the intersection of the fourth section 1411 and the sixth section 1413 is generally arced. An L-shaped third arm portion 1414 extends from the fourth section 1411 adjacent to the third inner corner 141a toward the fourth inner corner 141b along a direction substantially parallel to the fourth section 1411. A third contact portion 1415, which is generally crescent-shaped, extends from a distal end of the third arm portion 1414. The third contact portion 1415 is in the fourth inner corner 141b. A fourth arm portion 1416 extends from the sixth section 1413 adjacent to the fourth inner corner 141b along a direction parallel to the sixth section 1413. The fourth arm portion 1416 extends beyond the sixth section 1413. A fourth contact portion 1417, which is generally crescent-shaped, extends from a distal end of the fourth arm portion 1216. A second alignment groove 1418 is formed between the third contact portion 1415 and the fourth contact portion 1417. A second slot 1420, which is generally crescent-shaped, is formed in the center of and extends through the third contact portion 1415, leaving a second electrode 1419, which is generally circular.

The second contact portion 1217 and the fourth contact portion 1417 are respectively positioned in the third inner corner 141a and the first inner corner 121a. A rectangular third alignment groove 1221 is formed between the first contact portion 1215 and the fourth contact portion 1417. A rectangular fourth alignment groove 1421 is formed between the second contact portion 1217 and the third contact portion 1415. The first contact portion 1215 and the third contact portion 1415 are at opposite ends of a diagonal of the elastic electrode member 10. The second contact portion 1217 and the fourth contact portion 1417 are at opposite ends of another diagonal of the elastic electrode member 10.

The actuator 20 includes a lens retainer 22 and a wire 24 wound outside the lens retainer 22. The lens retainer 22 is tubular and made of plastic. The lens retainer 22 includes a main portion 221, a first end portion 222, and a second end portion 223. The main portion 221 is generally cuboid and connected between the first end portion 222 and the second end portion 223. The lens retainer 22 defines a receiving hole 224 for receiving at least a lens (not shown). The receiving hole 224 extends through the first end portion 222, the main portion 221, and the second end portion 223.

The first end portion 222 and the second end portion 223 are generally rectangular. The first end portion 222 includes a planar plate portion 2221. The plate portion 2221 includes a mounting surface 2222, a connection surface 2223 opposite to the mounting surface 2222, and four alignment protrusions 2224. The connection surface 2223 connects to the main portion 221. The four alignment protrusions 2224 are uniformly formed on the mounting surface 2222 around the receiving hole 224. The four alignment protrusion 2224 are generally cuboid and respectively correspond to the first alignment groove 1218, the second alignment groove 1418, the third alignment groove 1221, and the fourth alignment groove 1421.

The wire 24 includes a first end 241 and a second end 242. The first end 241 and the second end are configured to be connected to a power source (not shown). The wire 24 is configured to generate an electromagnetic field when the power source supplies a current.

Figure 3:
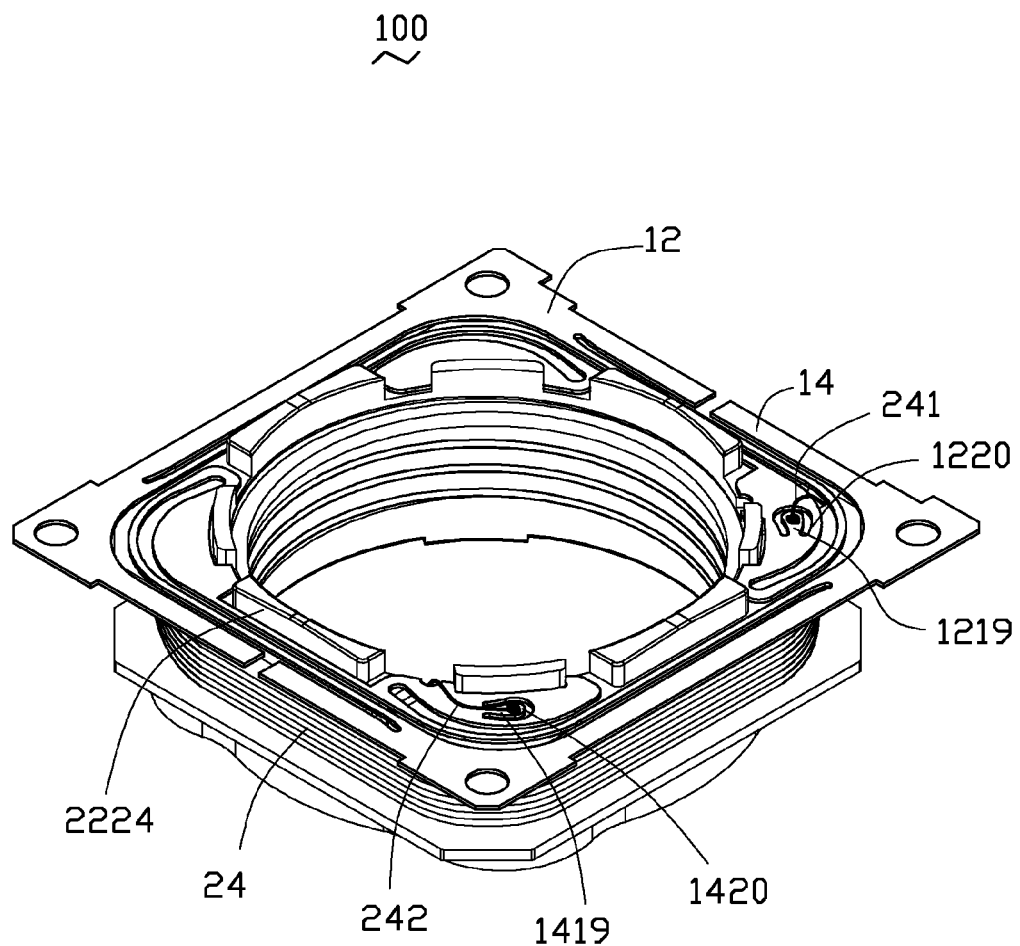
FIG. 3 is an isometric, assembled view of the VCM of FIG. 1.

Referring to FIGS. 1 to 3, when assembling, the first elastic metal sheet 12 and the second elastic metal sheet 14 are mounted to the first end portion 222. The first contact portion 1215, the second contact portion 1217, the third contact portion 1415, and the fourth contact portion 1417 are attached on the mounting surface 2222. The four alignment protrusions 2224 are respectively aligned to and received in the first alignment groove 1218, the second alignment groove 1418, the third alignment groove 1221, and the fourth alignment groove 1421. The first end 241 and the second end 242 are respectively soldered to the first electrode 1219 and the second electrode 1419.

It is more convenient to solder the first end 241 and the second end 242 to the first electrode 1219 and the second electrode 1419 because the elastic electrode member 10 is mounted to the first end portion 222. Furthermore, the first end 241 and the second end 242 can be quickly positioned to the first electrode 1219 and the second electrode 1419 and the first slot 1220 and the second slot 1420 can receive redundant soldering material during soldering.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A voice coil motor, comprising:
a lens retainer having a first end portion;
a wire having a first end and a second end, the wire being wound around the lens retainer; and
an elastic electrode member being mounted to the first end portion, the elastic member comprising a first elastic metal plate and a second elastic metal plate, the first elastic plate comprising a first electrode, the second elastic plate being physically separated from the first elastic metal plate and comprising a second electrode;
wherein the first end and the second end are respectively soldered to the first electrode and the second electrode;
wherein the first elastic plate comprises a first section, a second section, and a third section, the third section is substantially perpendicularly to the first section and distant from the second section, the second section is substantially perpendicularly connected to the first section, a first inner corner is positioned at intersection of the first section and the second section, a second inner corner is positioned at intersection of the first section and the third section, the first elastic plate comprises a first arm portion extending from the first section adjacent to the first inner corner toward the second inner corner along a direction substantially parallel to the first section, a crescent-shaped first contact portion extending from an end of the first arm portion, and a second arm portion extending from the third section adjacent to the second inner corner along a direction parallel to the third section, the second arm portion extends beyond the third section, the first elastic plate comprises a crescent-shaped second contact portion extending from an end of the second arm portion, and a crescent-shaped first slot defined in center of and extending through the second contact portion, leaving the first electrode.

2. The voice coil motor of claim 1, wherein the first inner corner and the second inner corner are arced, the first contact portion is positioned in the second inner corner.

3. The voice coil motor of claim 1, wherein the second elastic plate comprises a fourth section, a fifth section, and a sixth section, the fifth section is substantially perpendicularly connected to the fourth section, the sixth section is substantially perpendicularly to the fourth section distant from the fifth section, a third inner corner positioned at intersection of the fourth section and the fifth section, a fourth inner corner positioned at intersection of the fourth section and the sixth section, the second elastic plate comprises a third arm portion extending from the fourth section adjacent to the third inner corner toward the fourth inner corner along a direction substantially parallel to the fourth section, a crescent-shaped third contact portion extending from an end of the third arm portion, and a fourth arm portion extending from the sixth section adjacent to the fourth corner along a direction parallel to the sixth section, the fourth arm portion extends beyond the sixth section, the second elastic plate comprises a crescent-shaped fourth contact portion extending from an end of the fourth arm portion, and a crescent-shaped second slot defined in center of and extending through the third contact portion, leaving the second electrode.

4. The voice coil motor of claim 3, wherein the third contact portion is positioned in the fourth inner corner.

5. The voice coil motor of claim 3, wherein the third inner corner and the fourth inner corner are arced.

6. The voice coil motor of claim 3, wherein the second contact portion and the fourth contact portion are respectively positioned in the third inner corner and the first inner corner.

7. The voice coil motor of claim 3, wherein the elastic electrode member defines a first alignment groove between the first contact portion and the second contact portion, a second alignment groove between the third contact portion and the fourth contact portion, a third alignment groove between the first contact portion and the fourth contact portion, and a fourth alignment groove between the second contact portion and the third contact portion; the lens retainer comprises four alignment protrusions positioned on the first end portion, the four alignment protrusions are respectively received in the first, second, third and fourth alignment grooves.

8. The voice coil motor of claim 7, wherein the four alignment protrusions are generally cuboid and uniformly positioned on the first end portion.

9. A voice coil motor, comprising:

a lens retainer having a first end portion;

an elastic electrode member being mounted to the first end portion, the elastic member comprising a first electrode and a second electrode separated from the first electrode; and a wire wound around the lens retainer and having a first end and a second end, the first end and the second end being respectively soldered to the first electrode and the second electrode;

wherein the elastic electrode member comprises a first elastic plate and a second elastic plate physically separated from the first elastic plate, the first electrode is positioned on the first elastic plate, the second electrode is positioned on the second elastic plate; the first elastic plate comprises a first section, a second section, and a third section, the third section is substantially perpendicularly to the first section and distant from the second section, the second section is substantially perpendicularly connected to the first section, a first inner corner is positioned at intersection of the first section and the second section, a second inner corner is positioned at intersection of the first section and the third section, the first elastic plate comprises a first arm portion extending from the first section adjacent to the first inner corner toward the second inner corner along a direction substantially parallel to the first section, a crescent-shaped first contact portion extending from an end of the first arm portion, and a second arm portion extending from the third section adjacent to the second inner corner along a direction parallel to the third section, the second arm portion extends beyond the third section, the first elastic plate comprises a crescent-shaped second contact portion extending from an end of the second arm portion, and a crescent-shaped first slot defined in the center of and extending through the second contact portion, leaving the first electrode.

* * * * *